(12) United States Patent
Bening et al.

(10) Patent No.: US 7,449,518 B2
(45) Date of Patent: Nov. 11, 2008

(54) HIGH TEMPERATURE BLOCK COPOLYMERS AND PROCESS FOR MAKING SAME

(75) Inventors: Robert C. Bening, Katy, TX (US); Carl L. Willis, Houston, TX (US); Xavier Muyldermans, Shanghai (CN)

(73) Assignee: Kraton Polymers U.S. LLC, Houston, TX (US)

( * ) Notice: Subject to any disclaimer, the term of this patent is extended or adjusted under 35 U.S.C. 154(b) by 17 days.

(21) Appl. No.: 11/688,448

(22) Filed: Mar. 20, 2007

(65) Prior Publication Data

US 2008/0039584 A1 Feb. 14, 2008

Related U.S. Application Data

(60) Provisional application No. 60/785,529, filed on Mar. 24, 2006.

(51) Int. Cl.
*C08L 53/02* (2006.01)
*C08F 297/04* (2006.01)
*C08F 8/04* (2006.01)

(52) U.S. Cl. ............... 525/98; 525/105; 525/271; 525/314; 525/338; 525/342; 525/940; 524/505

(58) Field of Classification Search ............... 524/505; 525/98, 105, 271, 314, 338, 342, 940
See application file for complete search history.

(56) References Cited

U.S. PATENT DOCUMENTS

| | | | |
|---|---|---|---|
| RE27,145 E | | 6/1971 | Jones |
| 3,595,942 A | | 7/1971 | Wald et al. |
| 3,634,549 A | | 1/1972 | Shaw et al. |
| 3,670,054 A | | 6/1972 | De La Mare et al. |
| 3,700,633 A | | 10/1972 | Wald et al. |
| 3,706,817 A | | 12/1972 | Wald et al. |
| 4,039,593 A | | 8/1977 | Kamienski et al. |
| 4,041,103 A | | 8/1977 | Davison et al. |
| 4,232,137 A | | 11/1980 | Irvin et al. |
| 4,427,837 A | * | 1/1984 | Tung et al. ............ 525/314 |
| 4,431,777 A | | 2/1984 | Tung et al. |
| 4,614,768 A | | 9/1986 | Lo |
| 4,647,632 A | | 3/1987 | Priddy |
| 4,717,749 A | * | 1/1988 | Tang et al. ............ 524/271 |
| 5,057,583 A | * | 10/1991 | Tung et al. ............ 526/175 |
| 6,492,469 B2 | | 12/2002 | Willis et al. |
| 6,632,890 B1 | | 10/2003 | Bates et al. |
| 6,806,317 B2 | | 10/2004 | Morishita et al. |
| 6,815,475 B2 | | 11/2004 | Donald et al. |
| 2003/0065099 A1 | * | 4/2003 | Hahn et al. ............ 525/242 |
| 2003/0225920 A1 | | 12/2003 | Handlin, Jr. et al. |
| 2004/0054090 A1 | | 3/2004 | Bening et al. |
| 2005/0197464 A1 | | 9/2005 | Handlin, Jr. et al. |

FOREIGN PATENT DOCUMENTS

| | | |
|---|---|---|
| EP | 0 209 183 A2 | 7/1986 |
| EP | 1 498 455 A1 | 1/2005 |
| GB | 1 264 741 | 3/1970 |
| JP | 2001-172324 | 6/2001 |
| JP | 2003-073433 | 3/2003 |
| JP | 2003-073434 | 3/2003 |
| JP | 2004-091529 | 3/2004 |
| JP | 2004-091530 | 3/2004 |
| JP | 2004-091531 | 3/2004 |
| NL | 7401013 | 12/1974 |
| WO | 2005/044864 | 5/2005 |
| WO | 2005/047353 | 5/2005 |

OTHER PUBLICATIONS

"Hydrogenated Poly(styrene-co-x-methylstyrene) Polymers: A New Class of High Glass-Transition-Temperature Polyolefins" J.J. Xu et al. Journal of Polymer Science: Part B Polymer Physics 41-725-735 (2003).
"Synthesis and Characterization of x-Methylstyrene-Hydrgenated Isoprene Diblock Copolymer" Polymer (Korea) vol. 17, No. 5, pp. 477-483 (1993). Min Jong Kim et al.
"Compatibilizing Effects of Poly(x-methystyrene-b-hydrogenated ioprene) in PS/LDPE blend" Journel of Korean Ind, & Eng. Chemistry vol. 6, No. 5, Oct. 1995, 842-848.
U.S. Appl. No. 11/388,629 Specifically claims xms polymers. Filed Mar. 24, 2006 (simulations with present application).

* cited by examiner

*Primary Examiner*—Fred M Teskin
(74) *Attorney, Agent, or Firm*—Michael A. Masse

(57) ABSTRACT

A novel process for preparation of block copolymers containing, for example, alpha-methyl-styrene/styrene glassy blocks is claimed, where the glassy blocks contain 25-50 mol % alpha-methyl-styrene and have Tg values in the range of 120 to 140° C. The copolymerization process, which is conducted at 35 to 60° C. and relatively high solids contents and with continuous addition of styrene, results in very high conversions of the alpha-methyl-styrene. Selectively hydrogenated block copolymers having high glassy block Tg values are also disclosed and claimed as well as high service temperature elastomeric compositions comprising the block copolymer and an olefin polymer or copolymer.

25 Claims, 1 Drawing Sheet

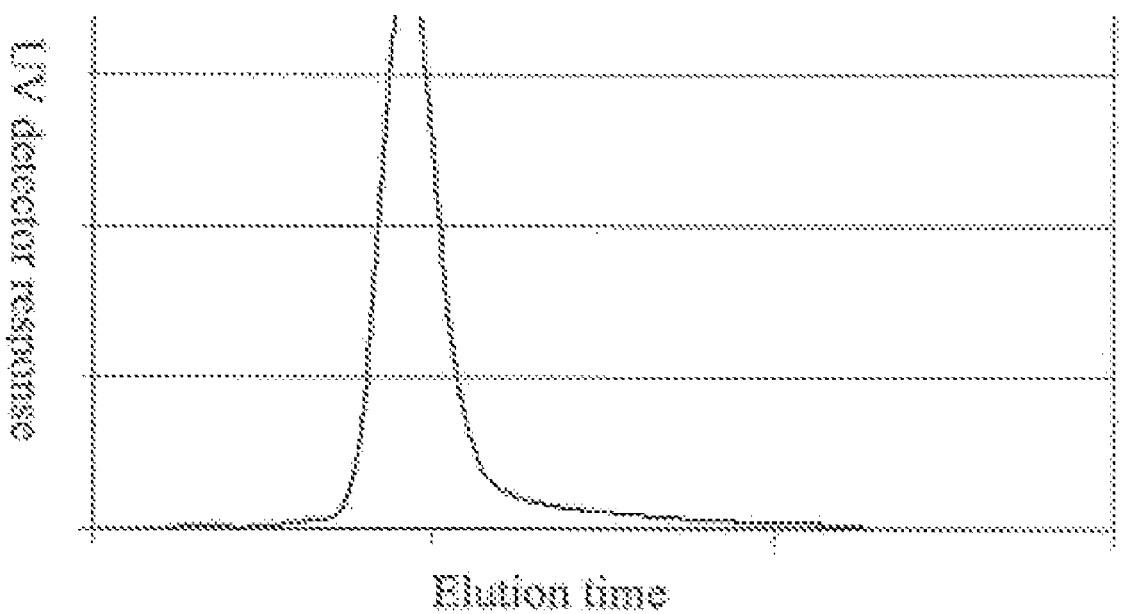
FIGURE

US 7,449,518 B2

HIGH TEMPERATURE BLOCK COPOLYMERS AND PROCESS FOR MAKING SAME

This application claims benefit of application Ser. No. 60/785,529 filed Mar. 24, 2006.

FIELD OF THE INVENTION

This invention relates to novel polymerization processes to prepare alpha-methyl-styrene (aMS)/styrene (S) copolymers and block copolymers comprising the save in which high conversions of aMS are achieved. The invention also relates to elastomeric block copolymers comprising aMS/S blocks having high glass transition temperatures. The invention further relates to compounds comprising the elastomeric block copolymers which demonstrate excellent high temperature performance.

BACKGROUND OF THE INVENTION

Alpha-methyl-styrene (aMS) is a technologically interesting monomer for homo- or copolymerization because of the resulting high glass transition temperature (Tg) of the polymers incorporating it. Inclusion of aMS as a comonomer with monovinyl-aromatic monomers such as styrene allows tailoring of the Tg of styrenic blocks. This is particularly suitable in anionic polymerizations where both aMS and styrene readily polymerize. Further, such high temperature glassy blocks can be expected to increase the service temperatures of thermoplastic block copolymers into which they are incorporated.

One well known problem associated with aMS polymers is their low ceiling temperature (Tc). The ceiling temperature is the temperature above which a polymer can spontaneously depolymerize. This presents a problem during polymerization where temperatures must be carefully maintained below Tc. Further, in elevated temperature applications aMS homopolymers will thermally decompose readily above Tc once decomposition is initiated by any process. One approach used to mitigate this problem is to copolymerize aMS with comonomers having high Tc. Such is the case with copolymers of aMS and styrene.

As second problem, heretofore unsolved, is the polymerization of aMS polymers, particularly copolymers with monovinyl-aromatic monomers, in which high conversions of aMS are achieved. This is important for the practical reason of avoiding difficult and expensive recycle operations. Also, in block copolymerization efficient consumption of the aMS monomer can prevent contamination of non-glassy blocks with the high Tg aMS.

Block copolymers have previously been prepared comprising aMS/S endblocks as taught in GB Patent 1,264,741. The polymerization was conducted to synthesize blocks having randomly distributed comonomers. The glassy endblocks of these block copolymers comprised a majority of aMS and between 10 and 40 mol % of styrene monomer. Importantly, the process required to synthesize these block copolymers was conducted at cold or cryogenic temperatures from −10 to −100° C.

Tapered block copolymers containing aMS have been taught in U.S. Pat. No. 4,427,837. The process taught therein suffered from conversions of less than 10% of the aMS monomer. Thus, large excesses of aMS monomer were required to incorporate modest amounts in the final polymer. Recovery of the unpolymerzied aMS monomer presents a significant practical problem.

Fully hydrogenated styrene/aMS/diene block copolymers have been taught in US Patent Application 2003/0065099. Small amounts of polar co-solvent were utilized in order to facilitate cross-over from the butadiene to the styrene/aMS. However, this process also suffered from very low conversions of the aMS monomer.

There yet exists a need for a process to copolymerize aMS/monovinyl-aromatic monomers which can be conducted at practical polymerization temperatures and which achieves high conversion of the aMS monomer. Such a process will allow the construction of block copolymers having high Tg glassy blocks and such block copolymers will be useful in making high service temperature rubber compounds. The present invention is directed to such a process, high Tg block copolymers and rubber compounds made from them.

SUMMARY OF THE INVENTION

In one embodiment the invention is a process for the preparation of block copolymers, and block copolymers made by the process, comprising adding alpha-methyl-styrene to an inert solvent wherein at the end of the subsequent copolymerization step, the solids content is from 20 to 50 wt % such that the concentration of living polymer-Li chain ends is from 500 to 2500 ppm and wherein the amount of alpha-methyl-styrene is from 25 to 50 mol % on the basis of the total amount of styrene and alpha-methyl-styrene, adding a polymerization modifier, adding an anionic polymerization initiator, adding styrene monomer continuously and copolymerizing said styrene and alpha-methyl-styrene to form a living glassy block at a temperature from 35 to 60° C. wherein said copolymerization is conducted in such a manner as to maintain a high concentration of alpha-methyl-styrene relative to styrene for the majority of the copolymerization achieving at least 45% conversion of the alpha-methyl-styrene, adding a conjugated diene of a mixture of conjugated dienes, and polymerizing said conjugated diene or mixture of conjugated dienes to form a living elastomeric block wherein the conversion of the conjugated diene or mixture of conjugated dienes is at least 90%.

In a another embodiment the invention is an elastomeric composition comprising a block copolymer having at least one glassy block consisting of a mixture of styrene and alpha-methyl-styrene wherein the amount of alpha-methyl-styrene is from 25 to 50 mol% on the basis of the total amount of styrene and alpha-methyl-styrene in the glassy block and the peak molecular weight of the glass block is from 2,000 to 3,000 g/mol, and at least one elastomeric block comprising a conjugated diene or a mixture of conjugated dienes wherein the elastomeric block has a molecular weight from 20,000 to 300,000 g/mol and the amount of the glassy block is from 10 to 40 wt % and an olefin polymer or copolymer.

In a further embodiment the invention is a selectively hydrogenated elastomeric block copolymer comprising at least one glassy block and at least one elastomeric block wherein the glassy block is a copolymer of an alpha-alkyl-vinyl-aromatic and monovinyl-aromatic monomers and where the molar ratio of alpha-alkyl-vinyl-aromatic monomer to monovinyl-aromatic monomer is from 25/75 to 50/50, the elastomeric block is a block of at least one polymerized conjugated diene having a vinyl content from between 20 to 85%, subsequent to hydrogenation from 0 to about 10% of the arene double bonds in the glassy block have been reduced and at least 90% of the conjugated double bonds have been reduced, each glassy block has a peak molecular weight from 2,000 to 50,000 g/mol and each elastomeric block has a peak molecular weight from 20,000 to 300,000 g/mol, the amount of glassy block is from 10 to 40 wt % on the basis of the total block copolymer mass, and the glass transition temperature of the glassy block is from 120 to 140° C.

BRIEF DESCRIPTION OF THE DRAWINGS

FIG. 1 is a GPC chromatogram of inventive polymer 5 from Example II.

DETAILED DESCRIPTION OF THE INVENTION

The process of the present invention is a unique polymerization process developed for the anionic synthesis of alpha-alkyl-vinyl-aromatic and monovinyl-aromatic copolymers and block copolymers containing them. The general features of anionic polymerization, for example solvents, initiators, and coupling agents, may be applied to the current invention. The unique aspects of the process involve comonomer addition schemes, solids content ranges, preferred copolymerization temperatures and polar co-solvents among other features described herein.

In particular, the inventive process is utilized to synthesize thermoplastic block copolymers having high glass transition temperature (Tg) glassy blocks. As used herein "thermoplastic block copolymer" is defined as a block copolymer having at least one glassy block generally polymerized from alpha-alkyl-vinyl-aromatic and monovinyl-aromatic monomers and at least one rubbery block generally polymerized from one or more dienes. The present invention includes as an embodiment a thermoplastic block copolymer composition, which may be a diblock, triblock copolymer, or multi-block composition. In the case of the diblock copolymer composition, one block is the glassy alpha-alkyl-vinyl-aromatic/monovinyl-aromatic copolymer block and the second polymer block is elastomeric and is substantially composed of conjugated diene. In the case of the triblock composition, it comprises glassy endblocks and an elastomeric midblock. Where a triblock copolymer composition is prepared, the conjugated diene block can be designated as "B" and the alpha-alkyl-vinyl-aromatic/monovinyl-aromatic blocks designated as "A" and "C". The A-B-C, triblock compositions can be made by sequential polymerization. A-B-A triblock compositions can be made by coupling living A-B diblocks. In addition to the linear triblock configurations, the blocks can be structured to form a radial (branched) polymer, (A-B)$_n$X, or both types of structures can be combined in a mixture. Some A-B diblock polymer can be present.

As defined, a high Tg value means having a glass transition temperature greater than 100° C. Typically, styrenic polymers including styrenic block copolymers have a glassy block Tg value approaching 100° C. One object of the present invention is to construct block copolymers having glassy blocks comprising alpha-alkyl-vinyl-aromatic/vinyl aromatic copolymer blocks having a glass transition temperature greater than that resulting in a monovinyl-aromatic homopolymer block. For instance, homopolymer styrene blocks of sufficiently high molecular weight have a Tg value near 100° C. Copolymerization with an alpha-vinyl-aromatic monomer such as alpha-methyl-styrene can lead to increases as large as 40° C. IN the present invention, the copolymer block comprising alpha-alkyl-vinyl-aromatic and monovinyl-aromatic monomers has a value from 120 to 140° C. Preferred are copolymer blocks having Tg values from 130 to 140° C.

The monomers used in the amionic polymerization process of the present invention include monovinyl-aromatic monomers, alpha-alkyl-vinyl-aromatic monomers and conjugated dienes. The alpha-alkyl-vinyl-aromatic monomer can be selected from alpha-methyl-styrene (aMS), alpha-ethyl styrene and substituted alpha-alkyl styrenes such as paramethyl-alpha-methyl-styrene and the like. Of these, alpha-methyl-styrene (aMS) is the most preferred. The monovinyl-aromatic monomer can be selected from styrene, para-methylstyrene, vinyl toluene, vinylnaphthalene, and para-tert-butyl styrene or mixtures thereof. Of these, styrene is most preferred and is commercially available, and relatively inexpensive, from a variety of manufacturers. The conjugated dienes for use herein are 1,3-butadiene and substituted butadienes such as isoprene, piperylene, 2,3-dimethyl-1,3-butadiene, and 1-phenyl-1,3-butadiene, or mixtures thereof. Of these, 1,3-butadiene and isoprene are most preferred. As used herein, and in the claims, "butadiene" refers specifically to "1,3-butadiene".

The solvent used as the polymerization vehicle may be any hydrocarbon that does not react with the living anionic chain end of the forming polymer, is easily handled in commercial polymerization units, and offers the appropriate solubility characteristics for the product polymer. For example, non-polar aliphatic hydrocarbons, which are generally lacing in ionizable hydrogen make particularly suitable solvents. Frequently used are cyclic alkanes, such as cyclopentane, cyclohexane, cycloheptane, and cyclooctane, all of which are relatively non-polar. Other suitable solvents will be known to one skilled in the art and can be selected to perform effectively in a given set of process conditions, with temperature being one of the major factors taken into consideration.

Anionic polymerization initiators in the present invention include, for example, alkyl lithium compounds and other organolithium compounds such as s-butyllithium, n-butyllithium, t-butyllithium, amyllithium and the like, including di-initiators such as the di-sec-butyl lithium adduct of m-di-isopropenyl benzene. Other such di-initiators are disclosed in U.S. Pat. No. 6,492,469. Of the various polymerization initiators, s-butyllithium is preferred. The initiator can be used in the polymerization mixture (including monomers and solvent) in an amount calculated on the basis of one initiator molecule per desired polymer chain. The lithium initiator process is well known and is described in, for example, U.S. Pat. Nos. 4,039,593 and Re. 27,145, which descriptions are incorporated herein by reference.

Another effect of the polymerization modifier in present invention is to control the microstructure of vinyl content of the conjugated diene in the elastomeric block. This is particularly important when the elastomeric blocks will be hydrogenated. The term "vinyl" refers to the presence of a pendant vinyl group on the polymer chain. When referring to the use of butadiene as the conjugated diene, it is preferred that about 20 to about 85 mol percent of the condensed butadiene units in the copolymer block have 1,2 vinyl configuration as determined by proton NMR analysis. For selectively hydrogenated block copolymers, preferably about 30 to about 70 mol percent of the conjugated diene units should have vinyl configuration.

In the process of the present invention, it is essential to maintain a high concentration of the alpha-alkyl-vinyl-aromatic monomer relative to the monovinyl-aromatic monomer during the copolymerization. In the case of copolymerization of aMS with styrene, the styrene monomer has the higher rate of polymerization. If both monomers were added in a batch fashion at the beginning of the copolymerization then styrene monomer would preferentially polymerize. Subsequently, a non-uniform, or tapered, distribution of comonomers would be obtained and a low conversion of aMS would be achieved. It has been discovered that use of a semi-batch addition of comonomers where all of the aMS and only a fraction of the styrene is added at the beginning of the copolymerization is one way to achieve uniform distributions and high aMS conversions. The remaining fraction of styrene monomer required for completion of the copolymer is added continuously during the copolymerization. In an alternative process, both monomers can be added continuously with the alpha-alkyl-vinyl-aromatic monomer being added at a much higher rate. In a preferred alternate embodiment, all of the aMS is added at the beginning of copolymerization and all of the styrene is added continuously during copolymerization over a period from more than 15 minutes up to 180 minutes or longer. Exceedingly long addition times can lead to high incidences of thermal termination which is undesirable. In the most preferred embodiments the continuous addition is performed for 30 minutes or more up to 60 minutes.

In the fully polymerized copolymer block, the alpha-alkyl-vinyl-aromatic monomer makes up from 25 to 50 mol % of the total aromatic monomers. Equivalently expressed, the molar ratio of alpha-alkyl-vinyl-aromatic monomer to monovinyl-aromatic monomer is from 25/75 to 50/50. The most preferred ratio of alpha-alkyl-vinyl-aromatic monomer to monovinyl-aromatic monomer is from 40/60 to 50/50. As the amount of alpha-alkyl-vinyl-aromatic monomer is increased, the resulting Tg value of the copolymer increases. Below 25 mol % alpha-alkyl-vinyl-aromatic monomer, the Tg value increase is small. In the range of 25 to 50 mol % the copolymer will have a Tg value of at least 120° C. and as high as 140° C. In the present invention, the more preferred compositions lead to Tg values from 130 to 140° C.

The glass transition temperature of a polymer is often associated with the temperature of onset of softening. At Tg the polymer undergoes a transition between glassy solid and viscous liquid states. For the polymers of the present invention the Tg value can be measured by any one the of the common methods employing for example mechanical, thermal, or electrical means.

In general, anionic polymerizations are practically conducted at temperatures between 30 and 90° C. In the present invention, it is important to conduct the copolymerization temperature in the range of 35-60° C. In this temperature range aMS is efficiently copolymerized while termination is minimized. Preferably, the copolymerization is conducted at a temperature from 35 to 50° C.

It is important to maintain a high concentration of living ends or, alternately expressed, a high lithium concentration. This is done by conducting the copolymerization at high solids contents. In the present invention "solids content" means the total mass of monomers to be polymerized or copolymerized expressed as a percentage of the total mass of monomers, solvents and modifiers. The preferred solids content is from 20 to 50 wt %. The more preferred solids content is 30 to 45 wt % and most preferred is from 35 to 45 wt %. Under these conditions the concentration of living polymer-lithium chain end is from 500 to 2500 ppm (0.008-0.04 mmol/g). The most preferred concentration of living polymer-lithium chain ends is from 1000 to 2500 ppm (0.016-0.04 mmol/g).

The lithium concentration is also effected by the molecular weight of the polymers. All other conditions being equal, lower molecular weight polymers require more initiator and hence more lithium than higher molecular weight polymers. In the present invention, an upper molecular weight limit is realized for the copolymer block for any given set of solids contents, copolymerization modifier, and temperature conditions in order to achieve high alpha-alkyl-vinyl-aromatic monomer conversion. The preferred peak molecular weight of the alpha-alkyl-vinyl-aromatic/monovinyl-aromatic copolymer block is from 2,000 to 30,000 g/mol, and most preferred is from 5,000 to 20,000 g/mol.

As used herein, the term "molecular weights" refers to the true molecular weight in g/mol of the polymer of block of the copolymer. The molecular weights referred to in this specification and claims can be measured with gel permeation chromatography (GPC) using polystyrene calibration standards, such as is done according to ASTM 3536. GPC is a well-known method wherein polymers are separated according to molecular size, the largest molecule eluting first. The chromatograph is calibrated using commercially available polystyrene molecular weight standards. The molecular weight of polymers measured using GPC so calibrated are styrene equivalent molecular weights. The styrene equivalent molecular weight may be converted to true molecular weight when the styrene content of the polymer and the vinyl content of the diene segments are known. The detector used is preferably a combination ultraviolet and refractive index detector. The molecular weights expressed herein are measured at the peak of the GPC trace, converted to true molecular weights, and are commonly referred to as "peak molecular weights".

It is important to utilize a copolymerization modifier. The modifier serves to improve the efficiency of incorporation of the comonomers during copolymerization. Typical copolymerization modifiers include, for example, polar modifiers such as dimethyl ether, diethyl ether, ethyl methyl ether, ethyl propyl ether and the like, and chelating polar modifiers such as diethoxy propane (DEP), 1,2-dioxy-ethane (dioxo), 1,2-dimethoxy-ethane (glymer) and ortho-dimethoxy-benzene (ODMB) and the like. The amount of modifier required depends upon the type of modifier. Non-chelating, polar modifiers such as diethyl ether (DEE) are typically most effective at relatively high levels. The preferred range of non-chelating, polar modifiers is from 2 to 20 wt % basis the entire mass of solvent plus modifier. The most preferred amount of non-chelating, polar modifier is 4 to 8 wt %. When the modifier is a chelating, polar modifier such as diethoxy-propane (DEP) or ortho-dimethoxy benzene (ODMB) then lower amounts are required. The preferred range of chelating, polar modifiers, in general, is from 50 to 1000 ppm basis the entire mass of solvent plus modifier. When the chelating modifier is DEP then the preferred amount of modifier is from 400 to 1000 ppm and the most preferred amount is from 500 to 700 ppm. When the chelating modifier is ODMB then the preferred amount of modifier is from 50 to 500 ppm and the most preferred amount is from 100 to 300 ppm.

Utilizing the copolymerization conditions specified herein very high conversions of the alpha-alkyl-vinyl-aromatic comonomer can be achieve. Under preferred conditions conversions of at least 45% are achieve. Under more preferred conditions conversions of at least 80% are achieved and under most preferred conditions conversions of at least 90% are achieved. These high conversion result in an efficient incorporation of the alpha-alkyl-aromatic monomer into the copolymer and obviate the need for gross recycle and recovery of the unpolymerized monomer.

Copolymer blocks of alpha-alkyl-vinyl-aromatic and monovinyl-aromatic monomers can be used to construct thermoplastic block copolymers according to well known synthetic strategies. In general, the living, anionic polymerization used to conduct the copolymerization can be continued with the synthesis of other blocks of anionically polymerizable monomers. For the purposes of the present invention, continuation of polymerization to form elastomeric blocks comprising conjugated dienes is preferred. The conjugated diene blocks may consist of a single conjugated diene, mixtures of conjugated dienes or mixtures with other non-diene monomers. The preferred molecular weight of the elastomeric blocks is from 20,000 to 300,000 g/mol and the most preferred molecular weight is from 30,000 to 100,000 g/mol. During the polymerization of the subsequent conjugated diene block at least a 90% conversion of monomer is required. The most preferred conversions are at least 95%.

In block copolymerization some fraction of the alpha-alkyl-vinyl-aromatic/monovinyl-aromatic block may not cross-over to conjugated diene polymerization. This may happen due to inadvertent termination of the block at the introduction of conjugated diene monomer or may happen by intentional addition of a terminating agent. In this case, some alpha-vinyl-aromatic/monovinyl-aromatic block will be present in the final block copolymer. This block may present the advantage of a highly compatible, high Tg resin for the high Tg alpha-alkyl-vinyl-aromatic/monovinyl-aromatic blocks having low volatility and blooming characteristics. In the present invention up to 50% of the alpha-alkyl-vinyl-aromatic/monovinyl-aromatic blocks may be so terminated. When the presence of a non-volatile flow promoter is desired, then the higher amounts in the range of 25 to 50 are desired. When high strength block copolymers are desired then the amount of terminated alpha-alkyl-vinyl-aromatic block is less than 25%, preferably less than 10% and most preferably less than 5%.

The thermoplastic block copolymers of the present invention can be represented by, but are not intended to be limited by, the formulas A-B, A-B-C, and (A-B)nX. Many other arrangements of A, B, and C blocks can be envisioned in a thermoplastic block copolymer of the present invention. In the general formulae A and C are glassy copolymer blocks of alpha-alkyl-vinyl-aromatic and monovinyl-aromatic monomers, B is an elastomeric block comprising conjugated dienes, X is the residue of a coupling agent and n represents the average number of coupled A-B arms. The amount of the glassy block in the thermoplastic block copolymer is from 10 to 40 wt % basis the total block copolymer mass. In this range the block copolymer exhibits thermoplastic elastomer character.

In the general formula for a coupled polymer, (A-B)nX, n is from 2 to about 30, preferably from about 2 to about 15 and most preferably from 2 to 6. When n is 2 the block copolymer has a linear configuration. When n is greater than 2 the block copolymer may be referred to as radial, branched or star. The coupling reaction may be conducted to link only a fraction of the living arms. In general, the amount of living arm which is linked in the coupling reaction is reported as the "coupling efficiency". The coupling efficiency is the mass of block copolymer which is linked basis the total mass of block copolymer. For example, a block copolymer having a coupling efficiency of 90% would have 90% of the polymer in a coupled configuration and 10% uncoupled. If A-B living arms were being coupled then this would leave 10% A-B diblock. Importantly, the coupling is generally a statistical process and n is an average number of coupled arms as taught in US Patent Application 2003/0225209 and 2004/0054090. For example, in a coupled block copolymer having species with 2, 3, 4 and 5 arms the average n may be 3. There will be an arm number distribution which will be important in considering the physical properties of the polymer. For example, coupled polymers with an average n=3 but having a relatively large fraction of n=5 will have a higher viscosity and lower melt flow than the comparable coupled polymer having an average n=3 but a small fraction of n=5.

In the present invention the coupling efficiency can be broadly varied depending upon the desired polymer properties. For example, low coupling efficiencies (<50%) can lead to highly processable polymers having low viscosities. High coupling efficiencies (>50%) can lead to polymers having high strength and elasticity.

A variety of coupling agents are known in the art and include, for example, dihalo alkanes, silicon halides, siloxanes, multifunctional epoxides, polyalkenyl compounds, including m-divinyl-benzene and the like, silica compounds, including alkoxy-silances, alkyl-silances, alkyl-alkyoxy-silances and the like, esters of monohydric alcohols with carboxylic acids, including dimethyl adipate and the like, and epoxidized oils. Preferred are tetra-alkoxysilanes such as tetra-ethoxysilane (TEOS) and tetra-methoxysilane, alkyl-trialkoxysilanes such as methyl-trimethoxy silane (MTMS), aliphatic diesters such as dimethyl adipate and diethyl adipate, and diglycidyl aromatic epoxy compounds such as diglycidyl ethers deriving from the reaction of bis-phenol A and epichlorohydrin. When subsequent hydrogenation or selective hydrogenation is desired the coupling agent should be chosen such that any residual unreacted coupling agents, coupling agent residues incorporated into the polymer chain or by-products of the coupling reaction do not interfere with the hydrogenation.

In the embodiment of the present invention where coupled block copolymers are made the coupling agent is added to the living polymer in a molar ratio to produce the coupled polymer with the desired arm number distribution. The coupling agent can be added as a pure compound or can be diluted in an inert solvent for ease of metering. The addition protocol can have an effect on the arm number distribution. After coupling, termination is normally not required.

In the embodiment of the present invention where non-coupled block copolymers are produced, the polymerization is stopped by addition of a terminating agent. Anionic polymerization is often terminated by addition of water to remove the lithium from the polymer chain end as lithium hydroxide (LiOH) or by addition of an alcohol (ROH) to remove the lithium as a lithium alkoxide (LiOR). The terminating agents are added in a molar excess to the living chain ends. When subsequent hydrogenation or selective hydrogenation is desired the terminating agent type and/or amount should be chosen such that residual terminating agent or termination by-products do not interfere with hydrogenation.

Hydrogenation can be carried out via any of the several hydrogenation or selective hydrogenation processes known in the prior art. For example, such hydrogenation has been accomplished using methods such as those taught in, for example, U.S. Pat. Nos. 3,595,942; 3,634,549; 3,670,054; 3,700,633; and Re. 27,145, the disclosures of which are incorporated herein by reference. These methods operate to hydrogenate polymers containing aromatic or ethylenic unsaturation and are based upon operation of a suitable catalyst. Such catalyst, or catalyst precursor, preferably comprises a Group VIII metal such as nickel or cobalt which is combined with a suitable reducing agent such as an aluminum alkyl or hydride of a metal selected from Groups I-A, II-A and III-B of the Periodic Table of the Elements, particularly lithium, magnesium or aluminum. This preparation can be accomplished in a suitable solvent of diluent at a temperature from about 20° C. to about 80° C. Other catalysts that are useful include titanium based catalyst systems.

Hydrogenation can be carried out under such conditions that at least about 90 percent of the conjugated diene double bonds have been reduced, and between zero and 10 percent of the aromatic double bonds have been reduced. Preferred ranges are at least about 95 percent of the conjugated diene double bonds reduced, and more preferably about 98 percent of the conjugated diene double bonds are reduced. Alternatively, it is possible to hydrogenate the polymer such that aromatic unsaturation is also reduced beyond the 10 percent level mentioned above. Such exhaustive hydrogenation is usually achieved at higher temperatures. In that case, the double bonds of both the conjugated diene and aromatic units may be reduced by 90 percent or more.

In one embodiment of the present invention a block polymer comprising at least one glassy block consisting of alpha-alkyl-vinyl-aromatic and monovinyl-aromatic monomers and at least one elastomeric block is compounded with olefin polymers. Olefin polymers include, for example, ethylene homopolymers, ethylene/alpha-olefin copolymers, homopolypropylene, propylene copolymers, propylene/alpha-olefin copolymers, and other alpha olefin copolymers or interpolymers. Those polymers can range from the low flow to high and a very high flow polyolefins often referred as waxes. Representative polyolefins include, for example, but are not limited to, substantially linear ethylene polymers, homogeneously branched linear ethylene polymers, heterogeneously branched linear ethylene polymers, including linear low density polyethylene (LLDPE), ultra or very low density polyethylene (ULDPE or VLDPE), medium density polyethylene (MDPE), high density polyethylene (HDPE) and high pressure low density polyethylene (LDPE). Other polymers included hereunder are ethylene/acrylic acid (EEA) copolymers, ethylene/methacrylic acid (EMAA) ionomers, ethylene/vinyl acetate (EVA) copolymers, ethylene/vinyl alcohol (EVOH) copolymers, ethylene/cyclic olefin copolymers, polypropylene homopolymers and copolymers, propylene/styrene copolymers, ethylene/propylene copolymers, polybutylene, ethylene carbon monoxide interpolymers (for example, ethylene/carbon monoxide (ECO) copolymer, ethylene/acrylic acid/carbon monoxide terpolymer and the like. Still other polymers included hereunder are styrenic type of polymers or copolymers like the PS ABS, alpha-methyl-styrene (aMS)/styrene (S) copolymers. Typical amounts of olefin polymer useful for the inventive elastomeric composition are from 5 to 500 parts per 100 parts of block copolymer. The preferred amount of olefin polymer is from 10 to 50 parts per 100 parts of block copolymer.

The elastomeric block copolymers of the present invention can also be compounded with low molecular weight tackifying resins. Low molecular weight tackifying resins include alpha-alkyl vinyl aromatic/mono vinyl aromatic block compatible resins and elastomeric block compatible resins. The alkyl vinyl aromatic/mono vinyl aromatic block compatible resin may be selected from the group of coumarone-indene resin, polyindene resin, poly(methyl indene) resin, polystyrene resin, vinyltoluene-alphamethylstyrene resin, alphamethylstyrene resin and polyphenylene ether, in particular poly (2,6-dimethyl-1,4-phenylene ether). such low molecular weight resins are e.g. sold under the trademarks "HERCURES", "ENDEX", "KRISTALEX", "NEVCHEM" and "PICCOTEX". Low molecular weight tackifying resins compatible with the elastomeric block may be selected from the group consisting of compatible $C_5$ hydrocarbon resins, hydrogenated $C_5$ hydrocarbon resins, styrenated $C_5$ resins, $C_5/C_9$ resins, styrenated terpene resins, fully hydrogenated or partially hydrogenated $C_9$ hydrocarbon resins, rosins esters, rosins derivatives and mixtures thereof. These resins are e.g. sold under the trademarks "REGALITE", "REGALREZ", "ESCOREZ", "OPPERA" and "ARKON. In the present invention $C_5$ or $C_9$ based tackifying resins are preferred. If the elastomeric block is hydrogenated, it is preferred to use hydrogenated tackifying resins. The amount of low molecular weight tackifying resin employed varies form about 5 to about 300 parts by weight per hundred parts by weight block copolymer, preferably about 10 to about 50 parts by weight.

The elastomeric block copolymers of the present invention can also be compounded with low molecular weight processing oils. Especially preferred are the types of oils that are compatible with the elastomeric block. If the elastomeric block is hydrogenated, it is preferred to use hydrogenated oils. Petroleum-based white oils having low volatility and less than 10% aromatic content are preferred. Typical paraffinic processing white oils with less than 2% aromatic can be used to soften and extend polymers of the present invention. The oils should additionally have low volatility, preferable having a flash point about 200° C. At the same time, the processing oils should have a relatively low viscosity to allow facile compounding. The amount of oil employed varies from about 5 to about 300 parts be weight per hundred parts by weight rubber, or block copolymer, preferably about 10 to about 100 parts by weight. Compounding or melt processing can be accomplished using any of the commonly applied polymer compounding equipment of techniques. Of particular importance are extrusion of injection molding techniques using either single screw or twin screws. A particularly interesting application is in over-molding where a composition containing the high Tg value block copolymer and optionally other thermoplastic polymers and process aides are injection molded onto a substrate of a more rigid polymer to impart a softer feel or different frictional characteristics.

In one further aspect of the present invention, an article comprising the high Tg block copolymer can be made in the form of a film, sheet, multi-layer laminate, coating, band, strip, profile, molding, foam, tape, fabric, thread, filament, ribbon, fiber, plurality of fibers, non-woven mats or a fibrous web. Another particularly interesting application is thermoplastic films which retain the processability of styrenic block copolymers but exhibit a higher "elastic power" similar to spandax polyurethanes. An even further interesting application is polyolefin modification where from 20 to 80% wt block copolymer is compounded with a polyolefin or olefin copolymer.

EXAMPLES

The following examples are provided as illustrations of the present invention. They are not meant to be limiting, but rather as enabling illustrations of the best mode of the invention. The molecular weights and molecular weight distribution were determined using gel permeation chromatography (GPC). The composition of the copolymers was measured using $^1$H NMR. The Tg values were measured using differential scanning calorimetry (DSC). Some of the terms found in the examples are defined in Table A.

TABLE A

| | |
|---|---|
| T | polymerization temperature |
| aMS | alpha-methyl-styrene, monomer or polymerized |
| St | styrene, monomer or polymerized |
| Bd | 1,3-butadiene, monomer or polymerized |

TABLE A-continued

| | |
|---|---|
| tgt aMS | target amount of alpha-methyl-styrene in aMS/St copolymer |
| theo solids | theoretical solids content. Calculated mass fraction of total mass of monomers basis the total mass of monomers plus solvent. Any modifier is considered part of the "solvent" for the purposes of solids content calculation. |
| frac St Batch | fraction of total styrene monomer which is initially added to copolymerizing solution in a batch fashion |
| prog time | time period over which styrene monomer is continuously added or "programmed" to copolymerizing solution |
| MW tgt | expected molecular weight at 100% conversion of both St and aMS |
| Mpk (st eq) | peak molecular weight as determined by GPC expressed as polystyrene calibration standard molecular weight |
| unrxt aMS (wt % cem) | unreacted portion of alpha-methyl-styrene monomer expressed as weight percent basis total mass of all monomers, solvent and modifiers |
| aMS conv | portion of alpha-methyl-styrene monomer converted to polymer |
| aMS copoly content | weight percent of alpha-methyl-styrene in the styrene/alpha-methylstyrene copolymer |
| Tg | glass transition temperature of recovered and dried copolymer as measured by differential scanning calorimetry |
| modifier | amount of polymerization modifier in ppm. |
| PPM Li | concentration of lithium residue from anionic polymerization catalyst expressed as parts per million total polymerization solution mass. Unless otherwise noted, this value is calculated from the observed molecular weight, correcting for unreacted aMS, and is therefore reflective of the number of living chains. |
| Tgt aMS | expected weight percent of aMS in the St/aMS copolymer if all of the aMS copolymerizes |
| [aMS] poly (NMR) | concentration of alpha-methyl-styrene in the St/aMS copolymer as measured by NMR expressed as percent weight. |
| Cem. conc | estimated concentration (based on entire reaction mass) at the end of a block copolymerization, assuming the reported aMS conversion was obtained in a block copolymerization in which the first (St/aMS copolymer) block comprised 33% of the resulting block copolymer, and the final reaction solids (including St, aMS and second block monomer) is 20% wt. |
| resid aMS % of initial | fraction of the total quantity of aMS that is left at the end of the copolymerization |
| [Bd] poly tgt (wt) | target amount of butadiene to be incorporated in the final polymer on a weight basis |
| [Bd] poly (wt) NMR | amount of butadiene incorporated into polymer as measured by NMR expressed as weight percent basis total weight of polymer |
| UVA Step I | area under the peak corresponding to the St/aMS copolymer segment in the GPC chromatogram, measured using a UV detector, in a block copolymer. The area of this peak is an indicator of the mole fraction of copolymer chains that failed to add diene in the second step of the copolymerization. |
| MW diblock "true" | true peak molecular weight of final diblock, after termination and/or before coupling, calculated by applying a compositional correction to account for Bd block |
| Step I | copolymerization of S/aMS copolymer block |
| Step II | polymerization of Bd block subsequent to copolymerization of S/aMS copolymer block |

In the following examples and data tables the polymers of the invention are numerically indicated. The comparative polymers are identified with a "C" prefix.

Example I

Copolymer glassy blocks of aMS and styrene were synthesized in the absence of a polymerization modifier in a 1L stainless steel autoclave. Cyclohexane and the aMS were added to the reactor. In this example no polymerization modified was used. In the case of semi-batch styrene copolymerization (polymers C1, C2 and C3) the batch portion of the styrene monomer was also added. Sec-butyl lithium was then added to initiate polymerization. The remaining styrene monomer was added at a constant rate over a specified program time, using a high pressure syringe pump. The examples of the invention were conducted at various copolymerization temperatures ranging from 50 to 70° C. when the reaction was complete, the living copolymerization was terminated by addition of isopropanol. The extent of polymerization of both monomers was estimated based on the concentrations of the monomers present at the end of the polymerization, as estimated by $^1$H NMR of the reaction mixture. Unless otherwise noted, essentially all of the styrene monomer was consumed:

styrene conversion was 100%. The polymer was recovered from solution, dried and characterized.

Table 1 shows the results of aMS/styrene copolymerizations conducted at 50% solids. Suitably high aMS conversions (from 67 to 78%) were obtained in polymers 1, 2 and 3 which were conducted without a batch charge of styrene monomer at the onset of copolymerization, and at high solids (high initial concentration of aMS and butyllithium). When a semi-batch protocol was used and styrene monomer was present at the onset of reaction and low solids contents were experienced, aMS conversions of less then 30% resulted.

Example II

Copolymer glassy blocks of aMS and styrene were synthesized according to the process of Example I with the following exceptions. The copolymerization used 6 wt % DEE as a polymerization modifier. All of the styrene monomer was added in a continuous fashion. No fraction of the styrene monomer was present in the reaction mixture at the onset of copolymerization. Table 2 shows the results of aMS/styrene copolymerizations conducted at high solids content (50%) and the 6% diethyl ether as polymerization modifier. The polymers had aMS conversions from 48 to 97% and resulting Tg values from 128 to 140° C. Narrow molecular weight distributions of the inventive polymers were obtained. The molecular weight distribution, as measured by GPC, is shown in FIG. 1 for polymer 5.

Example III

Copolymer glassy blocks of aMS and styrene were synthesized according to the process of Example II at various solids contents. Diethyl ether at 6 wt % was used as a polymerization modifier. The styrene monomer was added continuously over a 60 minute period. The copolymerizations were conducted at 50° C. Table 3 shows the results of the aMS/styrene copolymerizations. Copolymerizations at solids contents from 20 to 50 wt % and molecular weights less than 20,000 g/mol gave lithium concentrations from 900 to 2500 ppm. At theses conditions high aMS conversions were achieved. For the polymers made at 30 to 50% solids the aMS conversion was 85% or greater. The resulting Tg value of the copolymers was from 126 to 130° C.

Example IV

Copolymer glassy blocks of aMS and styrene were synthesized according to the process of Example II at various polymerization modifier levels. The copolymerization temperature was 50° C. Table 4 shows the results of aMS/styrene copolymerization conducted using various levels of diethyl ether. Diethyl ether levels of 20 wt % or less gave high conversion of aMS comonomer and Tg values from 124 to 140° C.

Example V

Copolymer glassy blocks of aMS and styrene were synthesized according to the process of Example II using chelating polymerization modifiers rather than DEE. Table 5 shows the results of aMS/styrene copolymerizations using diethoxypropane (DEP) and ortho-dimethoxy benzene (ODMB). The chelating modifiers gave copolymers having high aMS conversion and low molecular weight polydispersity.

Example VI

Copolymer glassy blocks of aMS and styrene were synthesized according to the process of Example II at various copolymerization temperature and styrene monomer addition rates. Table 6 shows the results of aMS/styrene copolymerizations conducted at temperatures ranging from 30 to 50° C. The inventive polymers had aMS conversions from 55 to 89%.

Example VII

Diblock copolymers having a glassy block of aMS and styrene and an elastomeric block of 1,3-butadiene were synthesized according to the method of Example II with the following exceptions. All of the examples were performed using continuous addition of styrene monomer. There was no styrene added to the reaction mixture prior to initiation. At the completion of the glassy block copolymerization, butadiene was added in a single batch charge. Table 7 shows the results for the (aMS/styrene)-butadiene diblock copolymers. Comparative polymers C7 and C8 were styrene-butadiene diblock copolymers made with no aMS. High levels of aMS could be incorporated into the copolymer when styrene was added over at least a 30 minute period, at temperatures of at least 40° C., and in the presence of 6% DEE. When the copolymerization was conducted at 40° C. with styrene monomer added continuously over 60 minutes (polymer 27) a high conversion of aMS was achieved (60%) and there was good cross-over to the butadiene block (UVA=21% ). Copolymerization performed at 30° C. with a 30 minute styrene addition (C9) resulted in relatively low aMS conversion (22%) during Step I copolymerization and a relatively high fraction of chains that did not incorporate a butadiene block (UVA=29%).

Example VIII

Triblock copolymers having a glassy block of aMS and styrene and an elastomeric block of 1,3-butadiene were synthesized according to the method of Example II with the following exceptions. The triblocks were polymerized in a two-reactor process. The aMS/styrene glassy blocks were copolymerized at high solids in a first reactor. As completion of the Step I polymerization the living chain ends were transferred to a second reactor. The second reactor contained purified butadiene monomer, cyclohexane solvent and diethyl ether modifier. Only approximately 10% of the butadiene required for elastomer block polymerization was initially present. After transfer of the living chain ends to the second reactor the remainder of the butadiene monomer was added continuously over a 20-30 minute interval. At the completion of this second block polymerization, or Step II, the polymers were coupled with methyl-trimethoxy silane (MTMS). The molar ratio of MTMS to Li was about 0.45. The coupled product was substantially a coupled linear triblock. Table 8 shows the results of [(aMS/styrene)-butadiene]$_2$ block copolymers. High conversions of aMS (47-98%), good crossover to the butadiene block (UVA≦25%) and good coupling efficiency (32-80%) was achieved.

Polymers 32 and 33 were selectively hydrogenated to a residual diene unsaturation of about 0.55, and 0.13 milliequivalents olefin/gram (respectively) using a Co/Al catalyst (about 40 ppm Co) at around 700 psi hydrogen and temperatures up to about 75° C. The catalyst was oxidized and extracted by contacting the cement with aqueous phosphoric acid while sparging with an $N_2/O_2$ gas blend. The cement was then washed with distilled water (while sparging with $N_2/O_2$)

until the cement was neutral (as tested using wet pH paper). The polymers were then recovered by hot water coagulation.

Example IX

Elastomeric compositions comprising the inventive selectively hydrogenated block copolymer was made with low molecular weight processing oil and homopolypropylene. The properties of the inventive compound were measured and compared to compounds made with conventional SEBS block copolymers. Comparative polymer C10 is a conventional styrene-ethylene/butylene-styrene block copolymer having a styrene endblock content of 20.6 wt %, a styrene endblock peak molecular weight of 10,000 and a vinyl content before hydrogenation of 50%. Comparative polymer C11 is a conventional styrene ethylene/butylene-styrene block copolymer having a styrene endblock content of 30% wt %, a styrene endblock peak molecular weight of 10,000 g/mol and a vinyl content before hydrogenation of 40%.

The compounds were made with 100 parts by weight of block copolymer, 50 parts of Primol 352, a paraffinic processing oil, and 35 parts of Moplen F30S homopolypropylene. The compounds were prepared by mixing the components for 10 minutes in a brabender mixer heaten at 190° C. and the melt temperature was recorded at the end of that mixing period. The collected compounds were then pressed into 6 mm thick platesat 180° C. with 150 bars for 1 minute, then cooled under pressure till room temperature. Harness was measured according to ASTM D2240. Compression set (CS) was measured according to ASTM D395. The melt flow rate (MFR) was measured according to ASTM D1238 using 200° C. and 5 kg.

Table 9 shows the compound formulations and the resulting physical properties. The results show excellent high temperature properties of the inventive compound relative to compounds containing conventional SEBS block copolymers. While equivalent in CS performance at low temperature (23° C.), the elastic recovery is significantly higher for the compound formulation according to the invention at 70° C. At equivalent hardness, the inventive polymer has a significantly improved (i.e., lower values) compression set at 70° C./24 hrs. Despite a lower triblock content, the inventive compound based on polymer 32 experiences a compression set of only 85% at this condition of temperature and time while the comparative compound based on C10 had a compression set of 94% and the comparative compound based on C11 had a compression set of 100%.

TABLE 1

| polymer | tgt aMS (mole %) | tgt aMs (wt %) | theo solids | T (° C.) | frac St Batch | prog time (min) | Mpk (st eg) | unrxt aMS (wt % cem) | aMs conv | aMS copoly content[1] | Tg (° C.) |
|---|---|---|---|---|---|---|---|---|---|---|---|
| 1 | 50% | 52% | 50% | 50 | 0% | 60 | 20,190 | 8.6% | 67% | 43% | 124 |
| 2 | 50% | 52% | 50% | 60 | 0% | 60 | 30,930 | 5.7% | 78% | 47% | 129 |
| 3 | 50% | 52% | 50% | 70 | 0% | 60 | 99,760 | 8.1% | 69% | 44% | 130 |
| C1 | 50% | 52% | 10% | 50 | 33% | 15 | 8,585 | 4.0% | 24% | 22% | — |
| C2 | 50% | 52% | 10% | 50 | 33% | 30 | 9,100 | 3.8% | 28% | 24% | — |
| C3 | 20% | 22% | 10% | 50 | 33% | 30 | 11,450 | 1.4% | 36% | 9% | — |
| C4 | 50% | 52% | 10% | 50 | 0% | 60 | 13,760 | 3.9% | 26% | 23% | — |
| C5 | 20% | 22% | 10% | 50 | 0% | 60 | 19,940 | 1.6% | 27% | 7% | — |

[1]Concentration of alpha-methyl styrene in St/aMS copolymer (% wt) based on the conversion of aMS, which is calculated by assuming that any aMS monomer that is not detected as residual has polymerized.

TABLE 2

| polymer | tgt aMS (mole %) | tgt aMS (wt %) | modifier | theo solids | T (° C.) | prog time (min) | Mpk (st eg) | unrxt aMS (wt % cem) | aMS conv | aMS copoly content[1] | Tg (° C.) |
|---|---|---|---|---|---|---|---|---|---|---|---|
| 4 | 50% | 52% | 6% DEE | 50% | 50 | 60 | 14,910 | 2.9% | 89% | 50% | 137 |
| 5 | 50% | 52% | 6% DEE | 50% | 50 | 30 | 15,580 | 3.1% | 89% | 50% | 140 |
| 6 | 50% | 52% | 6% DEE | 50% | 50 | 90 | 18,880 | 0.9% | 97% | 52% | 136 |
| 7 | 40% | 43% | 6% DEE | 50% | 50 | 60 | 13,710 | 0.8% | 96% | 42% | 130 |
| 8 | 50% | 52% | 6% DEE | 20% | 50 | 60 | 13,780 | 5.9% | 48% | 35% | 132 |
| 9 | 50% | 52% | 6% DEE | 20% | 65 | 60 | 18,960 | 4.2% | 63% | 42% | 128 |

[1]Concentration of alpha-methyl styrene in St/aMS copolymer (% wt) based on the converion of aMS, which is calculated by assuming that any aMS monomer that is not detected as residual has polymerized.

TABLE 3

| polymer | theo. solids | Mpk (st eg) | PPM L1 | aMS copoly content[1] | unrxt aMS (wt % cement) | aMS conv | resid aMs % of initial | Tg (° C.) |
|---|---|---|---|---|---|---|---|---|
| 10 | 20 | 15,060 | 900 | 34% | 2.8% | 67% | 33% | 126 |
| 11 | 30 | 11,370 | 1800 | 39% | 2.1% | 85% | 15% | 126 |
| 12 | 40 | 13,300 | 2050 | 40% | 1.7% | 90% | 10% | 126 |
| 7 | 50 | 13,710 | 2500 | 42% | 0.8% | 96 | 4% | 130 |

[1]Concentration of alpha-methyl styrene in St/aMS copolymer (% wt) based on the conversion of aMS, which is calculated by assuming that any aMS monomer that is not detected as residual has polymerized.

TABLE 4

| polymer | % DEE | prog time (min) | Mpk (st eg) | unrxt aMS (wt % cement) | PPM L1 | aMS copoly content[1] | aMS conv | Tg (° C.) |
|---|---|---|---|---|---|---|---|---|
| 1 | 0 | 60 | 20,190 | 8.6% | 1300 | 43% | 87% | 124 |
| 13 | 2 | 30 | 15,580 | 4.6% | 1788 | 49% | 84% | |
| 5 | 6 | 30 | 15,580 | 3.1% | 2060 | 50% | 89% | 140 |
| 34 | 20 | 30 | 9,309 | 9.9% | 2930 | 41% | 63% | |
| C6 | 38 | 30 | 7,177 | 14.9% | 4000 | 33% | 44% | |

[1]Concentration of alpha-methyl styrene in St/aMS copolymer (% wt) based on the conversion of aMS, which is calculated by assuming that any aMS monomer that is not detected as residual has polymerized.

TABLE 5

| polymer | Modifier | Modifier PPM | T (° C.) | prog time (min) | Mpk (st eg) | unrxt aMS (wt %) | PPM Li | aMS copoly content[1] | aMS conv |
|---|---|---|---|---|---|---|---|---|---|
| 14 | DEP | 600 | 50 | 60 | 16,950 | 7.9% | 1610 | 44% | 70% |
| 15 | ODMB | 150 | 50 | 30 | 11,360 | 9.4% | 2295 | 42% | 65% |
| 35 | DEP | 600 | 50 | 30 | 10,480 | 10.4% | 2450 | 41% | 61% |
| 36 | DEP | 600 | 70 | 30 | 44,130 | 10.6% | 580 | 40% | 60% |
| 16 | DEP | 600 | 70 | 60 | 107,100 | 11.7% | 302 | 39% | 56% |

[1]Concentration of alpha-methyl styrene in St/aMS copolymer (% wt) based on the conversion of aMS, which is calculated by assuming that any aMS monomer that is not detected as residual has polymerized.

TABLE 6

| polymer | tgt aMS (mole %) | tgt aMS (wt %) | theo solids | T (° C.) | prog (min) | Mpk (st eg) | unrxt aMS (wt %) | aMS conv | aMS copoly content[1] |
|---|---|---|---|---|---|---|---|---|---|
| 4 | 50% | 52% | 50% | 50 | 60 | 14,910 | 2.9% | 89% | 50% |
| 5 | 50% | 52% | 50% | 50 | 30 | 15,580 | 3.1% | 89% | 50% |
| 17 | 50% | 52% | 50% | 40 | 30 | 11,130 | 6.6% | 77% | 46% |
| 18 | 50% | 52% | 50% | 40 | 60 | 12,720 | 5.1% | 82% | 48% |
| 19 | 50% | 52% | 50% | 30 | 30 | 12,310 | 12.8% | 55% | 38% |
| 20 | 50% | 52% | 50% | 40 | 15 | 5,970 | 12.6% | 56% | 39% |

[1]Concentration of alpha-methyl styrene in St/aMs copolymer (% wt) based on the conversion of aMS, which is calculated by assuming that any aMS monomer that is not detected as residual has polymerized.

TABLE 7

| | Step I | | | | | | | | |
|---|---|---|---|---|---|---|---|---|---|
| polymer | T (° C.) | DEE (wt) | prog time (min)[1] | theo solids | Step I MW tgt | tgt [aMS] (wt)[2] | Mpk (st eg) | unrxt aMS (% wt) | aMS conv | aMS copoly content[3] |
| 21 | 50 | 6% | 60 | 27% | 5,000 | 43% | 2,956 | 1.1% | 91% | 41% |
| 22 | 50 | 6% | 60 | 22% | 5,000 | 43% | 4,253 | 1.8% | 81% | 38% |
| 23 | 50 | 6% | 60 | 27% | 5,000 | 43% | 3,219 | 1.8% | 87% | 40% |
| 24 | 50 | 6% | 60 | 24% | 10,000 | 43% | 7,700 | 2.9% | 72% | 35% |
| 25 | 50 | 2% | 60 | 24% | 10,000 | 43% | 9,034 | 2.7% | 74% | 36% |
| 26 | 50 | 6% | 30 | 24% | 10,000 | 43% | 6,208 | 3.4% | 87% | 34% |
| 27 | 40 | 6% | 60 | 24% | 10,000 | 43% | 6,668 | 4.1% | 80% | 31% |
| 28 | 40 | 6% | 30 | 24% | 10,000 | 43% | 8,060 | 4.8% | 54% | 29% |
| C7 | 50 | 6% | 60 | 27% | 5,000 | 43% | 2,597 | NA | NA | NA |
| C8 | 50 | 6% | 16 | 27% | 5,000 | 43% | 2,489 | NA | NA | NA |
| C9 | 30 | 6% | 30 | 24% | 10,000 | 43% | 7,111 | 8.1% | 22% | 14% |

| | Step II | | | | | |
|---|---|---|---|---|---|---|
| polymer | Step II Mw tgt | solids tgt | [Bd] poly tgt (wt) | Mpk (st eg) | [Bd] poly (wt) NMR[2] | UVA Step 1 | MW diblock true[3] |
| 21 | 10,000 | 43% | 50% | 18,490 | 85% | 31% | 12,495 |
| 22 | 15,000 | 42% | 38% | 54,150 | 80% | 26% | 33,400 |
| 23 | 10,000 | 43% | 50% | 19,280 | 84% | 29% | 13,163 |
| 24 | 15,000 | 32% | 33% | 29,740 | 51% | 30% | 22,026 |
| 25 | 15,000 | 32% | 33% | 45,330 | 55% | 42% | 32,445 |
| 26 | 15,000 | 32% | 33% | 23,130 | 47% | 24% | 16,885 |
| 27 | 15,000 | 32% | 33% | 27,350 | 51% | 21% | 20,300 |
| 28 | 15,000 | 32% | 33% | 16,360 | 52% | 10% | 13,580 |
| C7 | 10,000 | 43% | 50% | 13,360 | 50% | 16% | 9,989 |

TABLE 7-continued

| | | | | | | | | |
|---|---|---|---|---|---|---|---|---|
| C8 | 10,000 | 43% | 50% | 12,180 | 50% | 12% | 9,039 | |
| C9 | 15,000 | 32% | 33% | 44,700 | 63% | 29% | 30,900 | |

[1] for controls, programs wt % of styrene that corresponds to St change in aMS experiment,
[2] for St controls, corresponds to % wt St changed in batch fraction
[3] Concentration of alpha-methyl styrene in St/aMS copolymer (% wt) based on the conversion of aMS, which is calculated by assuming that any aMS monomer that is not detected as residual has polymerized.

TABLE 8

| | | | | Step I | | | | | |
|---|---|---|---|---|---|---|---|---|---|
| polymer | T (° C.) | prog time (min) | theo solids | MW tgt | tgt aMS (wt) | MW (st eg) | unrct aMS (wt % cem) | aMS conv | aMS copoly content[1] |
| 29 | 50 | 60 | 50% | 10,000 | 43% | 17,100 | — | — | — |
| 30 | 50 | 30 | 50% | 10,000 | 43% | 11,780 | 0.5% | 98% | 42% |
| 31 | 40 | 30 | 50% | 10,000 | 43% | 11,290 | 1.9% | 91% | 42% |
| 32 | 40 | 30 | 50% | 10,000 | 43% | 11,580 | 1.7% | 92% | 41% |
| 33 | 40 | 30 | 50% | 29,000 | 53% | 26,610 | 14.1% | 47% | 35% |

| | | Step II | | | | | | |
|---|---|---|---|---|---|---|---|---|
| polymer | Step II MW tgt | theo tgt | [Bd] poly tgt (wt) | Mpk st eg | [Bd] poly (wt) NMR[2] | UVA Step I | MW diblock true[3] | CE | linear of coupled |
| 29 | 50,000 | 20% | 80% | 154,900 | 77% | 25% | 98,500 | 32% | 94% |
| 30 | 50,000 | 20% | 80% | 148,200 | 84% | 22% | 90,200 | 32% | 100% |
| 31 | 50,000 | 20% | 80% | 94,100 | 81% | 10% | 56,300 | 76% | 100% |
| 32 | 50,000 | 20% | 80% | 86,760 | 77% | 10% | 56,200 | 75% | 42% |
| 33 | 91,000 | 20% | 68% | 189,000 | 78% | 13% | 121,000 | 80% | 95% |

[1] Concentration of alpha-methyl styrene in st/aMS copolymer (% wt) based on the conversion of aMS, which is calculated by assuming that any aMS monomer that is not detected as residual has polymerized
[2] Based on bulk analysis (includes fraction of step I that fails to add diene), styrenic monomer contents of diblock alone will be lower
[3] Correction based on overall polystyrene/alpha-methylstyrene content; treats aMS as St.

TABLE 9

| | | 32 | C10 | C11 |
|---|---|---|---|---|
| aMeStyrene/styrene | % w | 40/60 | 0/100 | 0/100 |
| HPS content' | % UV | 10% | low | low |
| Endblock Mm | kg/mole | 11.5 | 10 | 10 |
| End blocks content | % w | 21 | 20.6 | 30 |
| Vinyl % | | 38 | 50 | 40 |
| triblock Mm true | kg/mole | 110 | 100 | 67 |
| Triblock content | % UV | 78 | +/−100 | +/−100 |
| DMA End block Tg | ° C. | 137 | 105 | 100 |
| KG-1650 | | | | 100 |
| EDF-8766 | | 100 | | |
| RP6926 | | | 100 | |
| Primol 352 | | 50 | 50 | 50 |
| Moplen F30S: MFR12 | | 35 | 35 | 35 |
| Irganox 1010 | | 0.2 | 0.2 | 0.2 |
| Irganox PS800 | | 0.2 | 0.2 | 0.2 |
| process Melt Temp. | ° C. | 203 | 204 | 203 |
| Hardness 0 s-30 s | Shore A | 68-65 | 61-59 | 71-69 |
| CS 24 h 23° C. | % | 19 | 17 | 18 |
| CS 24 h 55° C. | % | 61 | 60 | 77 |
| CS 24 h 70° C. | % | 85 | 94 | 100 |
| Elastic recovery at 70° C./24 h: (100-CS %) | % | 15 | 6 | 0 |
| MFR 200° C., 5 kg | dg/min | 3 | 7 | 13 |

We claim:

1. A process for the preparation of block copolymers comprising:
   a. adding an alpha-alkyl-vinyl-aromatic monomer to an inert solvent;
   b. adding a polymerization modifier selected from the group consisting of diethyl ether, ortho-dimethoxy-benzene and diethoxy-propane;
   c. adding an anionic polymerization initiator selected from the group consisting of alkyl lithium compounds and organo-lithium compounds;
   d. adding monovinyl-aromatic monomer continuously and copolymerizing said monovinyl-aromatic and alpha-alkyl-vinyl-aromatic monomers to form a living glassy block at a temperature from 35 to 60° C. wherein said copolymerization is conducted in such a manner as to maintain a high concentration of alpha-alkyl-vinyl-aromatic monomer relative to monovinyl-aromatic monomer for the majority of the copolymerization achieving at least 45% conversion of the alpha-alkyl-vinyl-aromatic monomer such that at the end of this copolymerization step d, the solids content is from 20 to 50 wt % such that the concentration of living polymer-Li chain ends is from 500 to 2500 ppm and wherein the amount of alpha-alkyl-vinyl-aromatic monomer is from 25 to 50 mol % on the basis of the total amount of monovinyl-aromatic and alpha-alkyl-vinyl-aromatic monomers;
   e. adding a conjugated diene or a mixture of conjugated dienes; and
   f. polymerizing said conjugated diene or mixture of conjugated dienes to form a living elastomeric block wherein the conversion of the conjugated diene or mixture of conjugated dienes is at least 90%.

2. The process of claim 1 wherein the alpha-alkyl-vinyl-aromatic monomer is alpha-methyl-styrene and the monovinyl-aromatic monomer is styrene.

3. The process of claim 2 wherein the styrene monomer is added continuously after onset of initiation for more than 15 minutes.

4. The process of claim 2 wherein the styrene monomer is added continuously after onset of initiation for 30 minutes or more up to 60 minutes.

5. The process of claim 1 further comprising addition of a coupling agent selected from the group consisting of tetramethoxy silane, tetraethyoxy silane and methyl-trimethoxy silane after polymerization of the living elastomer block to form a coupled block copolymer.

6. The process of claim 1 further comprising selective hydrogenation wherein at least 90 mol % of the double bonds in the elastomeric block are hydrogenated and less than 10 mol % of the double bonds in the glassy block are hydrogenated.

7. The process of claim 1 wherein the polymerization modifier is diethyl ether in an amount form 2 to 10 wt % on the basis of the entire mass of inert solvent plus modifier.

8. The process of claim 1 wherein the polymerization modifier is diethoxy-propane in an amount form 400 to 1000 ppm.

9. The process of claim 2 wherein the conversion of alpha-methyl-styrene in step d) is at least 80%.

10. The process of claim 1 wherein the conjugated diene is 1,3-butadiene, isoprene or a mixture of 1,3-butadiene and isoprene.

11. The process of claim 1 further comprising steps subsequent to step f) wherein additional alpha-alkyl-vinyl-aromatic and monovinyl-aromatic monomers are added wherein the amount of alpha-alkyl-vinyl-aromatic monomer is from 25 to 50 mol % on the basis of the total additional amount of monovinyl-aromatic and alpha-alkyl-vinyl-aromatic monomers and the additional amount of monomers is copolymerized to form an additional living glassy block such that the conversion of the additional alpha-alkyl-vinyl-aromatic monomer is at least 45%.

12. The process of claim 11 further comprising addition of a terminating agent after copolymerization of the additional glassy block to form a terminated A-B-C triblock copolymer where A and C are glassy blocks and B is an elastomeric block.

13. The process of claim 1 wherein up to 50% of the alpha-alkyl-vinyl-aromatic/monovinyl-aromatic copolymer block is terminated before or at the beginning of step e).

14. The process of claim 1 wherein less than 10% of the alpha-alkyl-vinyl-aromatic/monovinyl-aromatic copolymer block is terminated before or at the beginning of step e).

15. An elastomeric composition comprising:
   a. a block copolymer having at least one glassy block consisting of a mixture of monovinyl-aromatic and alpha-alkyl-vinyl-aromatic monomers, wherein the amount of alpha-alkyl-vinyl-aromatic monomer is from 25 to 50 mol % on the basis of the total amount of monovinyl-aromatic and alpha-alkyl-vinyl-aromatic monomers in the glassy block, and at least one elastomeric block comprising a conjugated diene or a mixture of conjugated dienes, wherein the peak molecular weight of the glassy block is from 2,000 to 30,000 g/mol and the peak molecular weight of the elastomeric block is from 20,000 to 300,000 g/mol, the amount of the glassy block is from 10 to 40 wt % on the basis of the total block copolymer mass and the glass transition temperature of the glassy block is from 120 to 140° C., and;
   b. an olefin polymer or copolymer.

16. The elastomeric composition of claim 15 wherein the alpha-alkyl-vinyl-aromatic monomer is alpha-methyl-styrene and the monovinyl-aromatic monomer is styrene.

17. The elastomeric composition of claim 15 wherein the conjugated diene is 1,3-butadiene, isoprene or a mixture of 1,3-butadiene and isoprene.

18. The elastomeric composition of claim 15 wherein block B is hydrogenated where at least 90% of the conjugated double bonds have been reduced.

19. The elastomeric composition of claim 15 wherein the block copolymer has a general formula (A-B)n-X where A is a glassy block, B is an elastomeric block, X is the residue of a coupling agent and n is from 2 to 6, the peak molecular weight of the block A is form 5,000 to 20,000 g/mol, and the amount of block A is from 10 to 40 wt % on the basis of the entire block copolymer mass.

20. The elastomeric composition of claim 15 wherein the olefin polymer or copolymer is a propylene based polymer or copolymer or an ethylene based polymer or copolymer in an amount form 5 to 500 parts per 100 parts of block copolymer.

21. The elastomeric composition of claim 15 further comprising a low molecular weight tackifying resin or a low molecular weight processing oil in an amount from 5 to 300 parts per 100 parts of block copolymer.

22. A selectively hydrogenated elastomeric block copolymer comprising at least one glassy block and at least one elastomeric block wherein:
   a. the glassy block is a copolymer of alpha-methyl-styrene and styrene and where the molar ratio of alpha-methyl-styrene to styrene is from 25/75 to 50/50;
   b. the elastomeric block is a block of butadiene, isoprene or a mixture thereof having a vinyl content from between 20 to 85%;
   c. subsequent to hydrogenation from 0 to about 10% of the arene double bonds in the glassy block have been reduced and at least 90% of the conjugated double bonds in the elastomeric block have been reduced;
   d. each glassy block has a peak molecular weight from 2,000 to 50,000 g/mol and each elastomeric block has a peak molecular weight form 20,000 to 300,000 g/mol;
   e. the amount of the glassy block is from 10 to 40 wt % on the basis of the total block copolymer mass, and;
   f. the glass transition temperature of the glassy block is from 120 to 140° C.

23. The selectively hydrogenated elastomeric block copolymer of claim 22 having the general formula (A-B)n-X where A is a glassy block, B is an elastomeric block, n is from 2 to 6 and X is the residue of a coupling agent selected from the group consisting of tetramethoxy silane, tetraethoxy silane and methyl-trimethoxy silane.

24. The selectively hydrogenated elastomeric block copolymer of claim 22 wherein the block copolymer has the general linear structure A-B or A-B-C where A and C are glassy blocks and B is an elastomeric block.

25. An article selected from the group consisting of films, fibers, plurality of fibers, non-woven mats and multi-layer laminates comprising the selectively hydrogenated block copolymer of claim 22.

* * * * *